US008665298B2

(12) United States Patent
Hong et al.

(10) Patent No.: US 8,665,298 B2
(45) Date of Patent: Mar. 4, 2014

(54) METHOD FOR ANALYZING LIGHT PROFILE OF LIGHT SOURCE AND DEVICE AND METHOD FOR DRIVING LOCAL DIMMING OF LIQUID CRYSTAL DISPLAY DEVICE BY USING THE SAME

(75) Inventors: Hee-Jung Hong, Seoul (KR); Eui-Yeol Oh, Seoul (KR); Si-Hoon Lee, Incheon (KR); Jung-Hwan Lee, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 692 days.

(21) Appl. No.: 12/883,332

(22) Filed: Sep. 16, 2010

(65) Prior Publication Data

US 2011/0141155 A1    Jun. 16, 2011

(30) Foreign Application Priority Data

Dec. 14, 2009    (KR) .................. 10-2009-0123922

(51) Int. Cl.
*G09G 5/10*    (2006.01)

(52) U.S. Cl.
USPC .............. 345/690; 345/89; 345/102; 345/207

(58) Field of Classification Search
USPC .............................. 345/89, 98, 102, 207, 690
See application file for complete search history.

(56) References Cited

U.S. PATENT DOCUMENTS

| 2005/0007389 | A1 | 1/2005 | Kumamoto et al. | |
| 2007/0052661 | A1 | 3/2007 | Shikata | |
| 2009/0091528 | A1 | 4/2009 | Hong | |
| 2009/0109165 | A1* | 4/2009 | Park et al. | 345/102 |
| 2009/0179848 | A1* | 7/2009 | Schmidt et al. | 345/102 |
| 2009/0184917 | A1 | 7/2009 | Park et al. | |
| 2009/0201244 | A1 | 8/2009 | Park et al. | |
| 2009/0278786 | A1 | 11/2009 | Chan et al. | |
| 2009/0303171 | A1 | 12/2009 | Chang et al. | |
| 2010/0066752 | A1* | 3/2010 | Watanuki | 345/589 |
| 2011/0043547 | A1* | 2/2011 | Nonaka et al. | 345/690 |
| 2011/0122171 | A1* | 5/2011 | Kwon et al. | 345/690 |

FOREIGN PATENT DOCUMENTS

| CN | 101425275 A | 5/2009 |
| CN | 101510400 A | 8/2009 |

(Continued)

OTHER PUBLICATIONS

Office Action dated Jul. 18, 2013 by the Taiwanese Patent Office for Taiwanese counterpart application No. 099123710 (partial translation).

(Continued)

*Primary Examiner* — Amare Mengistu
*Assistant Examiner* — Gloryvid Figueroa-Gibson
(74) *Attorney, Agent, or Firm* — Morgan, Lewis & Bockius LLP

(57) ABSTRACT

Disclosed is a method for analyzing a light profile of a light source includes driving a light source of one of a plurality of blocks which divide a backlight unit, setting a light analyzing region matched to one light emission region of the light source, dividing the light analyzing region into at least two symmetric regions considering a form of the light emission region and symmetry of the light emission region, and analyzing and storing a light profile of one of the at least two symmetric regions.

17 Claims, 6 Drawing Sheets

(56) References Cited

FOREIGN PATENT DOCUMENTS

| JP | 2007-065572 A | 3/2007 |
| KR | 10-2009-0126337 A | 9/2009 |
| TW | 200917212 | 4/2009 |
| TW | 200933586 | 8/2009 |
| TW | 200935393 | 8/2009 |
| TW | 200947411 | 11/2009 |

OTHER PUBLICATIONS

Office Action dated May 15, 2013 by the Korean Patent Office for Korean counterpart application No. 10-2009-0123922.
Office Action issued by the Chinese Patent Office in counterpart Chinese Patent Application No. 201010238152.7 dated Apr. 15, 2013.

* cited by examiner (A) THE PRESENT INVENTION (B) THE RELATED ART (A) THE PRESENT INVENTION (B) THE RELATED ART

METHOD FOR ANALYZING LIGHT PROFILE OF LIGHT SOURCE AND DEVICE AND METHOD FOR DRIVING LOCAL DIMMING OF LIQUID CRYSTAL DISPLAY DEVICE BY USING THE SAME

CROSS REFERENCE TO RELATED APPLICATION

This application claims the benefit of the Patent Korean Application No. 10-2009-0123922, filed on Dec. 14, 2009, which is hereby incorporated by reference as if fully set forth herein.

BACKGROUND OF THE DISCLOSURE

1. Field of the Disclosure

The present invention relates to liquid crystal display devices, and more particularly, to a method for analyzing a light profile of a light source for reducing capacity of a memory which is to store light profile data and device and method for driving local dimming of a liquid crystal display device by using the same.

2. Discussion of the Related Art

Recently, as a picture display device, flat display devices, such as a liquid crystal display device LCD, a plasma display panel PDP, an organic light emitting diode OLED, and the like are used, mainly.

The liquid crystal display device is provided with a liquid crystal panel for displaying a picture with a pixel matrix which utilizes electric and optical characteristics of liquid crystals having anisotropy, such as refractive index and a dielectric constant, a driving circuit for driving the liquid crystal panel, and a backlight unit for irradiating a light to the liquid crystal panel. Each pixel of the liquid crystal display device controls transmissivity of the light passing through the liquid crystal panel and a polarization plate from the backlight unit by varying a direction of arrangement of the liquid crystal in response to a data signal, for producing gradation.

Brightness of each pixel of the liquid crystal display device is brightness of the backlight unit multiplied by the light transmissivity of the liquid crystals. For improvement of a contrast ratio and reducing power consumption, the liquid crystal display device uses backlight dimming in which a received picture is analyzed to adjust a dimming value for controlling the brightness of the backlight unit and making data compensation. For an example, the backlight dimming reduces the backlight brightness by reducing the dimming value, and increases the brightness by making the data compensation, thereby reducing the power consumption.

Recently, the backlight unit uses an LED backlight in which light emitting diodes (hereafter, LED) are used as a light source which has advantages of high brightness and low power consumption. Since the LED backlight unit enables control of each position, the LED backlight unit can be driven by a local dimming in which the backlight is divided into a plurality of light emission blocks for controlling the brightness block by block. The local dimming can improve the contrast ratio further and reduce the power consumption further since the local dimming divides the backlight unit and the liquid crystal panel into a plurality of blocks respectively, analyzes the data on a block-by-block basis to determine a local dimming value and make data compensation.

Since the local dimming divides the backlight unit into the plurality of light emission blocks and controls brightness of the backlight unit on the block-by-block basis, reducing whole brightness of the backlight unit lower than the global dimming, input data is compensated for the local dimming at the time of the local dimming. The local dimming compensates the data by measuring a light profile of a light source of each block, storing the light profile to a memory, and analyzing the light profile stored thus to determine a quantity of a light which reaches to each pixel.

However, the related art local dimming has a problem in that a substantially large memory is required because brightness data of all pixels at a light emission region are stored as the light profile data on each of the light blocks.

SUMMARY OF THE DISCLOSURE

Accordingly, the present invention is directed to a method for analyzing light profile of a light source and device and method for driving local dimming of a liquid crystal display device by using the same.

An object of the present invention is to provide a method for analyzing light profile of a light source which can reduce a capacity of a memory which stores a light profile data of a light source and device and method for driving local dimming of a liquid crystal display device by using the same.

Additional advantages, objects, and features of the disclosure will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for analyzing a light profile of a light source includes driving a light source of one of a plurality of blocks which divide a backlight unit, setting a light analyzing region matched to one light emission region of the light source, dividing the light analyzing region into at least two symmetric regions considering a form of the light emission region and symmetry of the light emission region, and analyzing and storing a light profile of one of the at least two symmetric regions.

The light analyzing region is divided into four symmetric regions symmetric to each other in up, down, left, right directions if the backlight unit is a direct lighting type, and light quantity data on one of the four symmetric regions are stored.

The light analyzing region is divided into two symmetric regions symmetric to each other in up, down, or left, right directions if the backlight unit is an edge lighting type, and light quantity data on one of the two symmetric regions are stored.

In another aspect of the present invention, a method for driving local dimming of a liquid crystal display device includes dividing a light analyzing region of a light source of one of a plurality of blocks which divide a backlight unit into at least two symmetric regions considering a form and symmetry of the light emission region, and storing light quantity data of each pixel in one of the at least two symmetric regions to a memory, analyzing input image data on a block-by-block basis to determine a local dimming value of each block, calculating a gain value by light quantity analysis by using the light quantity data of each pixel stored in the memory and the local dimming value of each block, compensating the input image data using the gain value, and controlling brightness of the backlight on the block-by-block basis by using the local dimming value of each block.

The light quantity analysis uses the light quantity data on one of the symmetric regions as the light quantity data of the light analyzing region by accessing the one symmetric region of the light analyzing region repeatedly while changing a direction of access to the memory, considering symmetry of the symmetric region.

The calculating the gain value includes calculating a first total light quantity of the light quantity data reaching to the present pixel from a plurality of blocks when an entire backlight unit is at the maximum brightness using the light quantity data on each pixel, calculating a second total light quantity reaching to the present pixel from plurality of blocks which are driven by a local dimming method by using local dimming value of each block and the light quantity data of each pixel, and calculating a gain value as a ratio of the first total light quantity to the second total light quantity.

In another aspect of the present invention, a method for driving a liquid crystal display device includes supplying the compensated data to the liquid crystal display device using the local dimming methods as recited above, and displaying the input image data by a combination of the brightness of the backlight controlled on the block-by-block basis and light transmissivity controlled by the compensated data in the liquid crystal panel.

In another aspect of the present invention, a device for driving local dimming of a liquid crystal display device includes an image analyzer analyzing input image data on a block-by-block basis corresponding to each of a plurality of blocks which divide a backlight, a dimming value decider for determining a local dimming value of each block according to a result of analysis of the picture analyzer, a memory storing light quantity data of each pixel in one of at least two symmetric regions, wherein a light analyzing region is a light emitting region of a light source of one of the plurality of blocks and at least two symmetric regions divide the light analyzing region considering a form and symmetry of the light emission region, a gain value calculator calculating a gain value by light quantity analysis using the light quantity data of each pixel stored in the memory and the local dimming value of each block, and a data compensator compensating the input image data by the gain value from the gain value calculator.

The memory outputs the light quantity data on the light analyzing region by accessing one symmetric region of the light analyzing region repeatedly while changing a direction of access to the memory, taking symmetry the symmetric region into account.

In another aspect of the present invention, a liquid crystal display device includes the device for driving local dimming, a panel driver for supplying a compensated data from the device for driving local dimming to a liquid crystal panel, a timing controller for forwarding a compensated data from the device for driving local dimming to the panel driver as well as controlling driving timing of the panel driver, a backlight unit including a plurality of light emission blocks for directing a light to the liquid crystal panel, and a backlight driver for driving the plurality of light emission blocks by using a local dimming value of each block from the device for driving local dimming.

The timing controller has the device for driving local dimming built therein.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DESCRIPTION OF SPECIFIC EMBODIMENTS

Reference will now be made in detail to the specific embodiments of the present invention, examples of which are illustrated in the accompanying drawings. Wherever possible, the same reference numbers will be used throughout the drawings to refer to the same or like parts.

Figure 1:
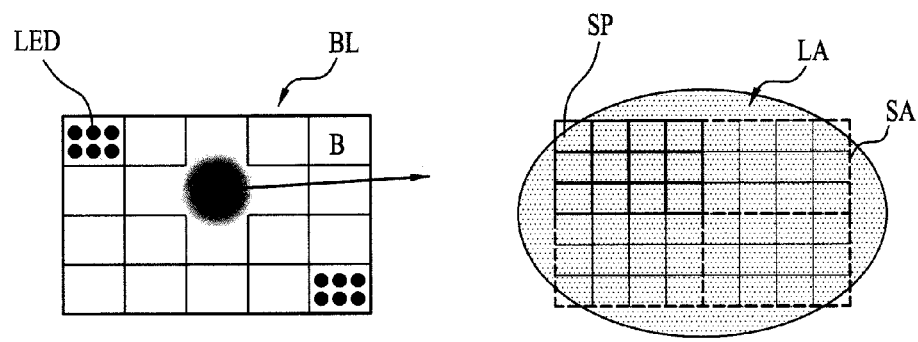
FIG. 1 illustrates diagrams for comparing a light profile analyzing method in accordance with a preferred embodiment of the present invention to the same of the related art.
Figure 1:
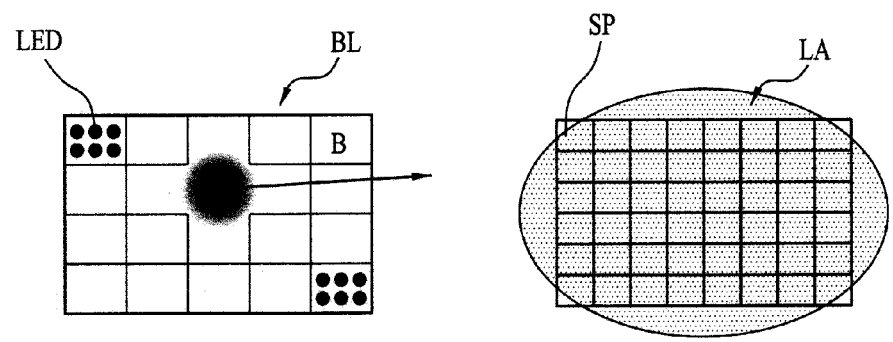

FIG. 1 illustrates diagrams for comparing a light profile analyzing method on a direct lighting type backlight unit in accordance with a preferred embodiment of the present invention to the same of the related art.

Referring to FIG. 1, the direct lighting type backlight unit BL has an LED array, as a light source, facing an entire display region of a liquid crystal panel to emit light thereto. The LED array of the direct lighting type backlight unit BL is divided into a plurality of blocks B, driven on a block-by-block basis and has brightness thereof controlled on the block-by-block basis.

Referring to FIG. 1, in order to analyze the light profile, a light source in one block B in the direct lighting type backlight unit BL is driven, and a light analyzing region LA of the light emission region of the light source having a matrix of sampling points SP is set to a display region. In the direct lighting type backlight unit BL, the light emission region of the light source in the block B is close to a circle or an ellipse, and the matrix of the light analyzing region LA matched to the circular light emission region is set greater than the light emission region. Each of the sampling points SP can be matched to each of the pixels, or a plurality of the pixels. In the present invention, as shown in FIG. 1A, the light analyzing region LA is divided into a plurality of symmetric regions SA considering a light emission form of the light source and symmetry of the light source into account. As shown in FIG. 1A, if the light source of the block B has a circular emission, the light analyzing region LA matched to the circular light emission region can be divided into four symmetric regions SA in up/down and left/right directions. Then, the light quantities are measured only at sampling points SP of one of a plurality of the symmetric regions SA, and the light quantity data on the sampling points SP of the one symmetric region SA are stored at the memory in the liquid crystal display device as the light profile data. In the meantime, after measuring the light quantities of all of the sampling points SP of the one light analyzing region LA, the light quantity data on one symmetric region SA may be stored.

Different from the related art in which the light quantity data on sampling points SP of entire light analyzing region LA of the light source in the block B are stored in the memory as shown in FIG. 1B, since the light quantity data on sampling points SP of one symmetric region SA which is ¼ of the light analyzing region LA of one block of light source are stored as shown in FIG. 1A, a light profile analyzing method of the direct lighting type backlight unit in accordance with a preferred embodiment of the present invention can reduce the capacity of the memory to ¼. For example, if it is assumed that the light analyzing region LA has 30×30 sampling points, though 30×30=900 bytes of memory is required in the related art because the light quantity data on an entire light analyzing region LA are stored in the related art, since the present invention requires a storage space only for 15×15=225 bytes which are the light quantity data on 15×15 sampling points of one symmetric region which is ¼ of the light analyzing region LA, the method for analyzing a light profile of the present invention can reduce a memory capacity to ¼ of the related art.

Figure 2:
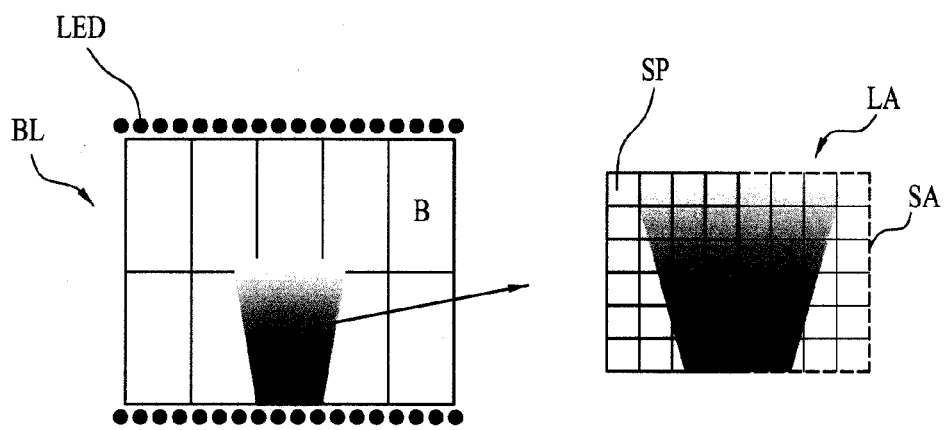
FIG. 2 illustrates diagrams for comparing a light profile analyzing method in accordance with another preferred embodiment of the present invention to the same of the related art.
Figure 2:
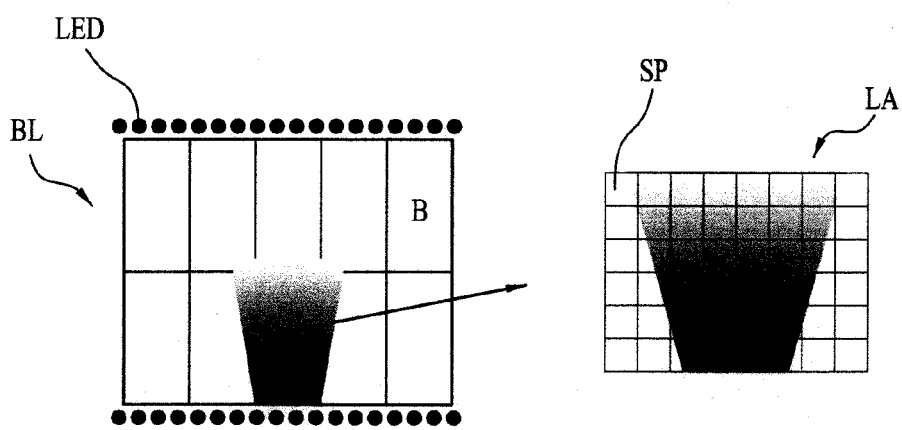

FIG. 2 illustrates diagrams for comparing a light profile analyzing method on an edge type backlight unit in accordance with another preferred embodiment of the present invention to the same of the related art.

Referring to FIG. 2, the edge type backlight unit BL has an LED array, as a light source, to emit light from at least one of four edges of the display region of the liquid crystal panel. The edge type backlight unit BL changes the light from the LED array to a facial light source by means of a light guide plate and supplies the facial light to the display region of the liquid crystal panel. FIG. 2 illustrates a case in which the LED array is arranged on upper and lower edges of the display region. The LED array of the edge type backlight unit BL is divided into, and driven in, a plurality of blocks B matched to a plurality of blocks of the display region and the brightness of each block B is controlled on a block basis.

Referring to FIG. 2, in order to analyze the light profile, a light source of one block B in the edge type backlight unit BL is driven, and a light analyzing region LA of the light emission region of the light source having a matrix of sampling points SP is set to a display region. In the edge type backlight unit BL, the light emission region of the light source in the block B is close to a trapezoid (fan shape), and the matrix of the light analyzing region LA matched to the trapezoidal light emission region is set greater than the light emission region. Each of the sampling points SP can be matched to each of the pixels, or a plurality of the pixels. In the present invention, as shown in FIG. 2A, the light analyzing region LA is divided into a plurality of symmetric regions considering a light emission form of the light source and symmetry of the light source into account. As shown in FIG. 2A, if the light source of the block B has a trapezoidal (fan shape) emission, the light analyzing region LA matched to the trapezoidal light emission region can be divided into two symmetric regions SA in left/right directions. Then, the light quantities are measured only at sampling points SP of one of the two symmetric regions SA, and the light quantity data on the sampling points SP of the one symmetric region SA are stored at the memory in the liquid crystal display device as the light profile data. In the meantime, after measuring the light quantities of all of the sampling points SP of the one light analyzing region LA, the light quantity data on one symmetric region SA may be stored.

Different from the related art in which the light quantity data on sampling points SP of the light emission region LA are stored in the memory as shown in FIG. 2B, since the light quantity data on sampling points SP of one symmetric region SA which are ½ of the light emission region LA are stored as shown in FIG. 2A, a light profile analyzing method of the edge type backlight unit in accordance with a preferred embodiment of the present invention can reduce the capacity of the memory to ½.

Figure 3:
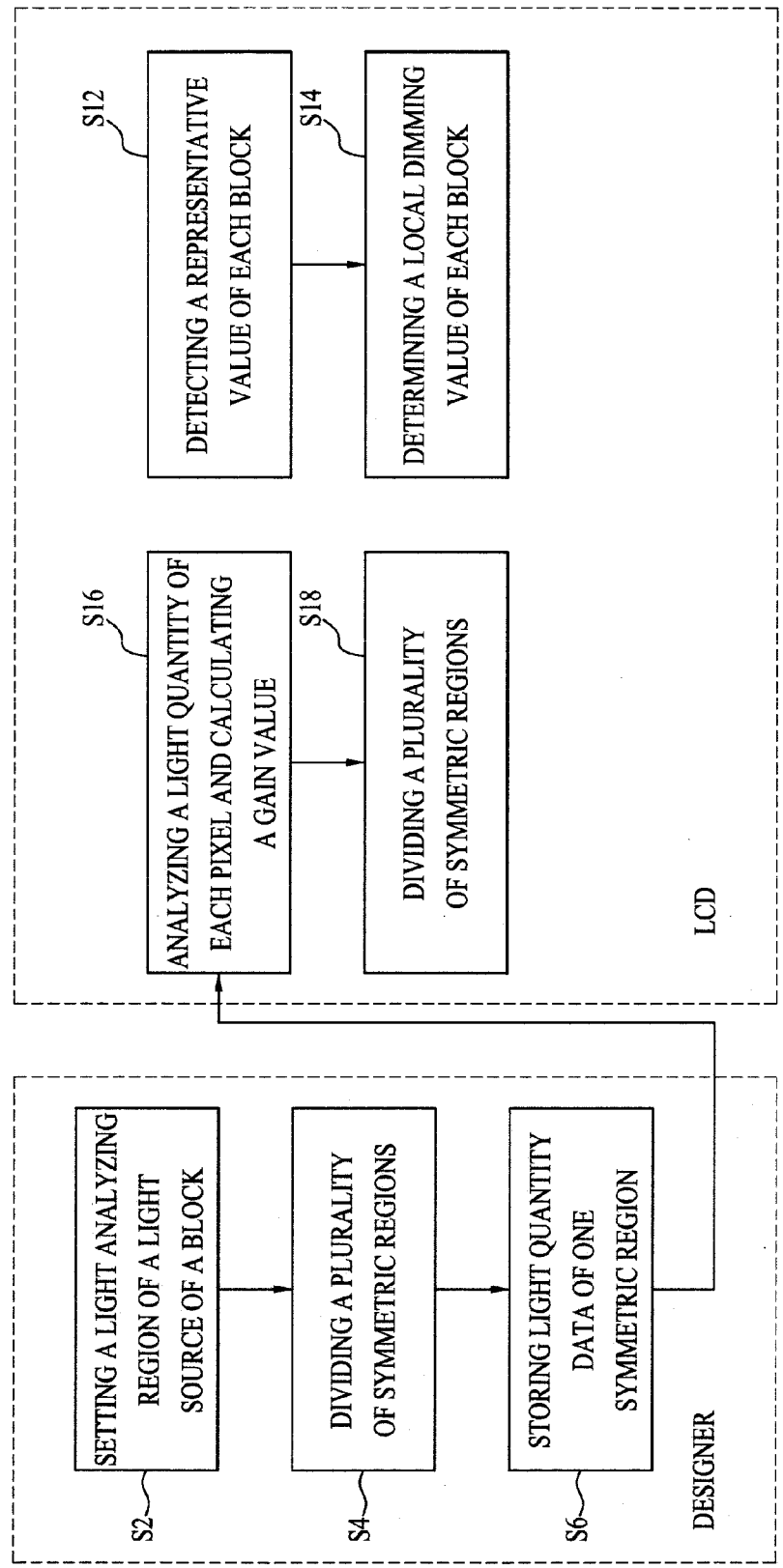
FIG. 3 illustrates a diagram showing the steps of a method for driving local dimming of a liquid crystal display device in accordance with a preferred embodiment of the present invention.

FIG. 3 illustrates a flow chart showing the steps of a method for driving local dimming of a liquid crystal display device in accordance with a preferred embodiment of the present invention, which utilizes the method for analyzing a light profile in accordance with a preferred embodiment of the present invention.

At first, a designer stores light quantity data only on one of symmetric light analyzing regions to a memory of liquid crystal display device, light quantity data is obtained by light quantity analysis considering a form and symmetry of a light emission region of the light source in one block (S2~S6).

In a step 2 (S2), the designer drives a light source of one block of the backlight unit which is driven divided into a plurality of blocks and sets a light analyzing region having a matrix of sampling points to the display region with reference to a light emission region of the light source. It can be known that, in a case of the direct lighting type backlight unit as shown in FIG. 1, the light emission region of the light source is circular, and in a case of the edge type backlight unit as shown in FIG. 2, the light emission region of the light source is trapezoidal.

In a step 4 (S4), the light analyzing region LA is divided into a plurality of symmetric regions SA considering a light emission form and symmetry of the light source. In a case of the direct lighting type backlight unit as shown in FIG. 1, the light analyzing region LA matched to the circular light emission region is divided into four symmetric region SA which is symmetry in up/down and left/right directions. In a case of edge type backlight unit as shown in FIG. 2, the light analyzing region LA matched to the trapezoidal light emission region is divided into two symmetric regions SA which are symmetry in left/right or up/down directions.

In a step 6 (S6), light quantities of sampling points SP of only one of the plurality of the symmetric regions SA are measured, and the light quantities of the sampling points SP of only one symmetric region SA are stored in the memory of the liquid crystal display device as a light profile data. Or, after measuring light quantities of all sampling points SP of one light analyzing region LA, the light quantity data of one symmetric region SA may be stored. Since, in a case of the direct lighting type backlight unit as shown in FIG. 1, the light quantity data of only one of the four symmetric regions SA are stored in the memory, and in the case of the edge type backlight unit, the light quantity data of only one of the two symmetric data is stored in the memory, a capacity of the memory for storing the light quantity data can be reduced.

The liquid crystal display device analyzes input image data on the block-by-block basis to determine local dimming values on each block for controlling backlight brightness on the block-by-block basis, and compensates the data by using the light profile stored in the memory and the local dimming values for each block (S12~S18).

In a step 12 (S12), the liquid crystal display device analyzes one frame of input image data on the block-by-block basis to detect a representative value of each block. For an example, a maximum value of each pixel is detected from the input image data and then the maximum values of pixels are divided on the block-by-block basis corresponding to each of light emission blocks. The maximum values of pixels in each block are summed and averaged to detect an average of each block as representative value of each block.

In a step 14 (S14), the liquid crystal display device determines the local dimming values of the blocks respectively corresponding to the representative values of the blocks, and outputs to a backlight driver. In general, since the local dimming values respectively corresponding to the representative values of the blocks are set in advance in a form of a look-up table by the designer, the local dimming values corresponding to the representative values of the blocks are selected from the look-up table on the block-by-block, and the forwarded.

In a step 16 (S16), the liquid crystal display device calculates first and second total light quantities reaching to the pixel presently by using the light profile data stored in the memory set in advance in the step 6 (S6), and calculates a gain value as a ratio of the first and second light quantities and outputs the gain value. Though the memory has light quantity data on one of the symmetric regions which are divisions of the light analyzing region of a light source in one block, by accessing one symmetric region repeatedly while changing a direction access in left→right, right→left or up→down, down→up taking symmetry of the symmetric regions into account, the light quantity data on one analyzing region can be used by expanding the light quantity data on one analyzing region. And, by using the light quantity data on each pixel from the memory, a sum of the light quantity data reaching to the present input pixel and the light quantity data reaching to the present pixel from a plurality of block light sources adjacent to the present input pixel is calculated as a first total light quantity at the time an entire backlight unit is at the greatest brightness. And, in a case backlight brightness is adjusted on the block-by-block basis according to the local dimming value by summing multiplication of the local dimming value of each block to each of the light quantity data reaching to the present pixel from a plurality of light sources, a second total light quantity reaching to the present pixel from plurality of blocks adjacent to the present pixel is calculated. Then, a ratio of the first total light quantity of the present pixel to the second total light quantity of the present pixel is calculated according to an equation 1 below to forward a gain value of the present pixel.

A gain value of each pixel=(a first total light quantity of each pixel at the greatest brightness of a backlight)/(a second total light quantity of each pixel at the backlight adjusted by local dimming) (1)

In a step 18 (S18), by multiplying the gain value calculated to the input data for the present pixel, the data for each pixel is compensated and outputted.

Figure 4:
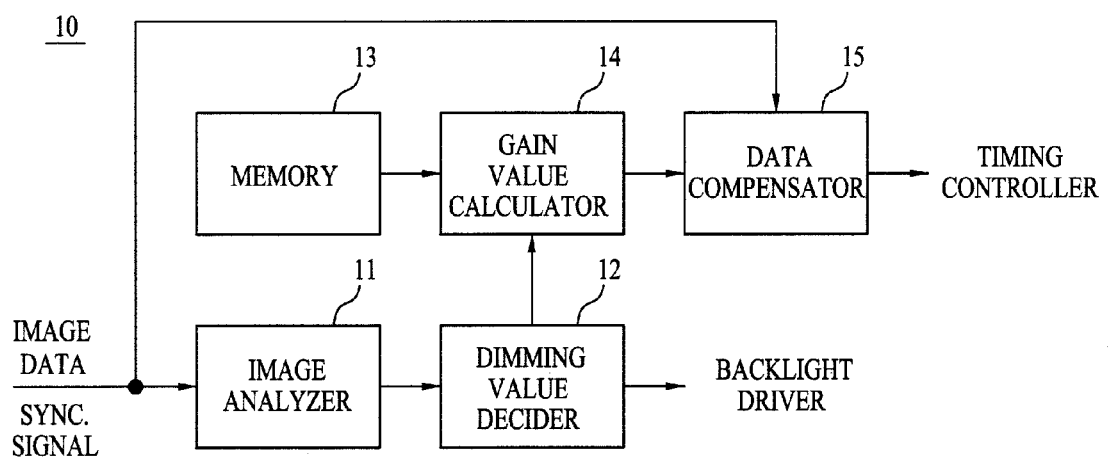
FIG. 4 illustrates a block diagram of a device for controlling local dimming of a liquid crystal display device in accordance with a preferred embodiment of the present invention.

FIG. 4 illustrates a block diagram of a local dimming driver of a liquid crystal display device in accordance with a preferred embodiment of the present invention.

Referring to FIG. 4, the local dimming driver 10 includes a image analyzer 11, a dimming value decider 12, a memory 13, a gain value calculator 14, and a data compensator 15.

The image analyzer 11 analyzes input image data on the block-by-block basis corresponding to each light emission block of the backlight unit, detects and outputs a representative value of each block to the dimming value decider 12. In detail, the picture analyzer 11 detects the maximum value of each pixel from the input image data, divides the maximum values of pixels on the block-by-block basis, sums and averages the divided maximum values to detect an average of each block as representative value of each block, and outputs the representative value of each block to the dimming value decider 12.

The dimming value decider 12 determines a local dimming value of each block corresponding to the representative value of each block from the image analyzer 11 and outputs the local dimming value of each block to the backlight driver. The dimming value decider 12 selects and outputs the local dimming value of each block corresponding to the representative value of each block by using a look-up table set in advance. The dimming value decider 12 aligns the local dimming values of the blocks according to an order of block connection in the backlight unit, and outputs the local dimming values aligned thus to the backlight driver.

The memory 13 has the light quantity data of each sampling point (each pixel) on one of the plurality of the symmetric regions which are divided considering symmetry of the light analyzing region of one light source of the block stored therein. Though the memory 13 has the light quantity data of only one symmetric region stored therein, the memory 13 can output entire light quantity data of each pixel on one analyzing region by accessing the one symmetric region repeatedly while changing a direction of access in left→right, right→left, or in up→down, down→up taking symmetry of up, down, left, right of the symmetric region into account.

The gain value calculator 14 calculates a first and second total light quantities which reach to the present pixel by using the light quantity data of each pixel from the memory 13 and the local dimming value of each block from the dimming value decider 12, and calculates and outputs a gain value as a ratio of the first and second total light quantities. The gain value calculator 14 calculates a sum of the light quantity data reaching to the present input pixel and the light quantity data reaching to the present pixel from a plurality of block light sources adjacent to the present input pixel as a first total light quantity at the time an entire backlight unit is at the maximum brightness by using the light quantity data on each pixel from the memory. And, the gain value calculator 14 calculates a second total light quantity reaching to the present pixel from plurality of blocks adjacent to the present pixel in a case backlight brightness is adjusted on the block-by-block basis according to the local dimming value by summing multiplication of the local dimming value of each block to each of the light quantity data reaching to the present pixel from a plurality of light sources. Then, the gain value calculator 14 calculates a ratio of the first total light quantity of the present pixel to the second total light quantity of the present pixel to output a gain value of the present pixel.

The data compensator 15 multiplies the gain value from the gain value calculator 14 to the gain value calculated from the input data for the present pixel to compensate the data of the present pixel and outputs the compensated data.

Thus, since the local dimming device and method in accordance with the present invention store and use light quantity data only on one of symmetric regions which are divisions of a light analyzing region of one light source of the block, the local dimming device and method can reduce a capacity of the memory.

Figure 5:
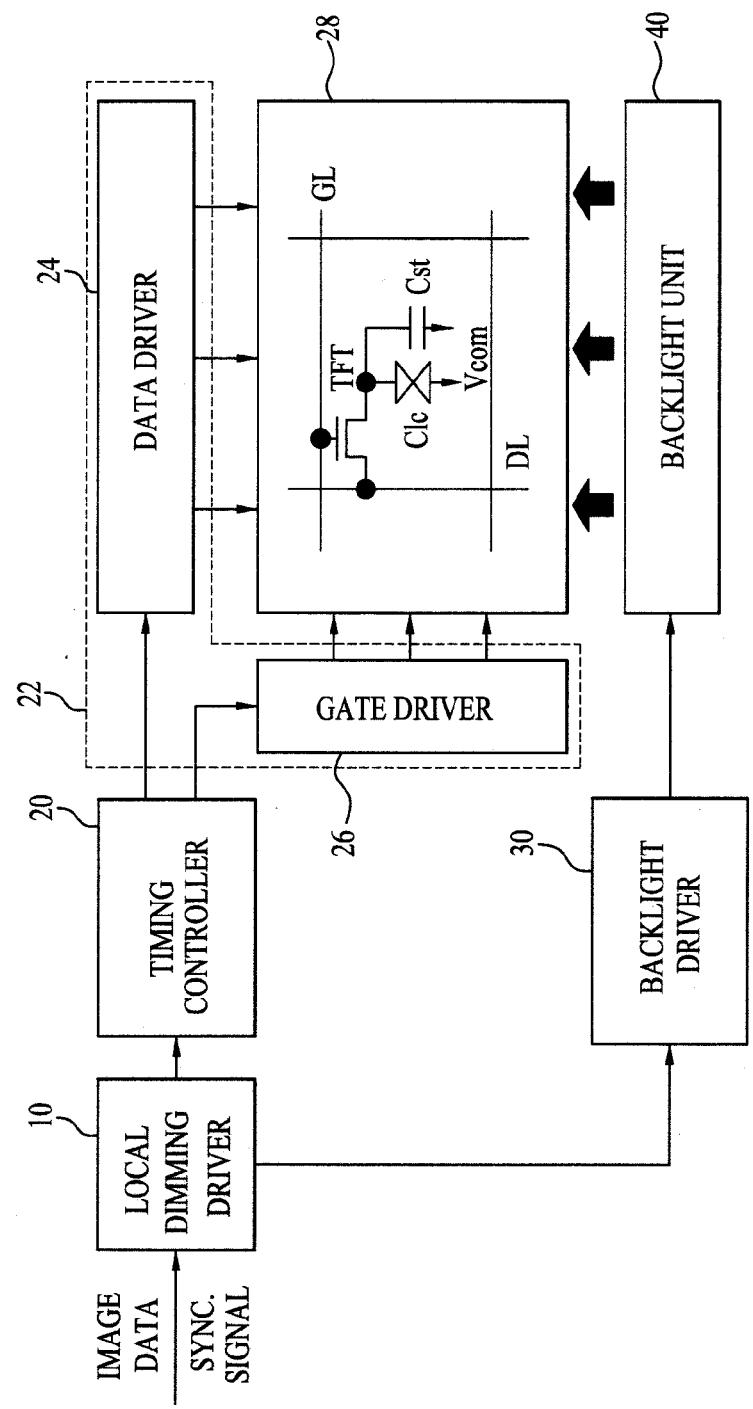
FIGS. 5 and 6 illustrate block diagrams of a liquid crystal display device in accordance with preferred embodiments of the present invention.
Figure 6:
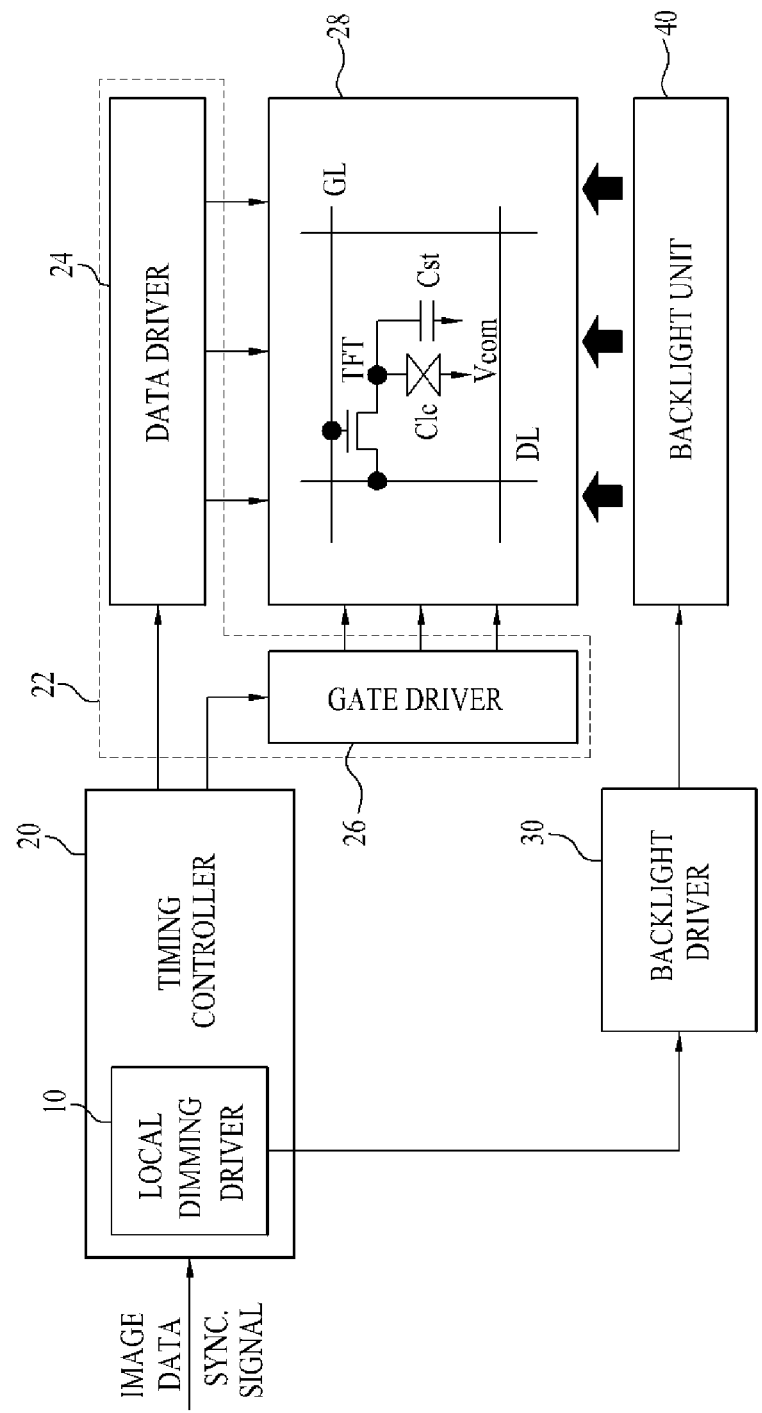

FIGS. 5 and 6 illustrate block diagrams of a liquid crystal display device in accordance with preferred embodiments of the present invention schematically, having the local dimming driver 10 in FIG. 4 applied thereto.

Referring to FIG. 5, the liquid crystal display device includes a local dimming driver 10 analyzing input image data on the block-by-block basis to determine local dimming values, and compensating the data, a timing controller 20 supplying data from the local dimming driver 10 to a panel driver 22 and controlling drive timing of the panel driver 22, a backlight driver 30 driving an LED backlight unit 40 on the block-by-block basis with reference to the local dimming value of each block from the local dimming driver 10, and a liquid crystal panel 28 driven by a data driver 24 and a gate driver 26 of the panel driver 22. In this instance, the local dimming driver 10 can be built in the timing controller 20 as shown in FIG. 6.

The local dimming driver 10 analyzes the input image data on the block-by-block basis by using the input image data and synchronizing signals, determines the local dimming value of each block according to a result of the analysis, and outputs the local dimming value to the backlight driver 30. As described before, an external or internal memory of the local dimming driver 10 has the light quantity data on only one of the symmetric regions which are divisions of the light analyzing region of one light source of each block stored therein. Though the memory has the light quantity data on only one of the symmetric regions stored therein, the memory outputs entire light quantity data of each pixel on one analyzing region by accessing the one symmetric region repeatedly while changing a direction of access in left→right, right→left, or in up→down, down→up taking symmetry of up, down, left, right of the symmetric region into account. The local dimming driver 10 calculates the gain value by the light quantity analysis using the light quantity data of each pixel from the memory and the local dimming value of each block, compensates the data using the gain value, and outputs the compensated data to the timing controller 20.

The timing controller 20 aligns the data from the local dimming driver 10 and outputs the aligned data to the data driver 24 of the panel driver 22. The timing controller generates a data control signal which controls driving timing of the data driver 24, and a gate control signal which controls driving timing of the gate driver 26 by using a plurality of synchronizing signals, i.e., a vertical synchronizing signal, a horizontal synchronizing signal, a data enable signal, and dot clock from the local dimming driver 10 and outputs the data control signal and the gate control signal to the data driver 24 and the gate driver 26 respectively. In the meantime, in order to improve a response speed of the liquid crystals, the timing controller 20 may includes an overdriving circuit (not shown) for adding an overshoot value or an undershoot value to a data depending on a difference of data between adjacent frames to modulate the data.

The panel driver 22 includes the data driver 24 for driving data lines DL of the liquid crystal panel 28, and the gate driver 26 for driving gate lines GL of the liquid crystal panel 28.

The data driver 24 converts a digital picture data from the timing controller 20 into an analog data signal (a pixel voltage signal) by using a gamma voltage in response to the data control signal from the timing controller 20 and supplies the analog data signal to the data line Dl of the liquid crystal panel 28.

The gate driver 26 drives the gate lines GL of the liquid crystal panel 28 in response to the gate control signal from the timing controller 20 in succession.

The liquid crystal panel 28 displays a picture with a pixel matrix which is an array of pixels. Each of the pixels produces a desired color by a combination of red, green, and blue sub-pixels which control light transmissivity by varying an orientation of liquid crystals in response to the data signal having brightness thereof compensated thus. Each of the sub-pixels includes a thin film transistor TFT connected to the gate line GL and the data line DL, and a liquid crystal capacitor Clc and a storage capacitor Cst connected to the thin film transistor TFT in parallel. The liquid crystal capacitor Clc has a difference voltage between the data signal supplied to the pixel electrode through the thin film transistor TFT and a common voltage Vcom supplied to the common electrode charged therein, and drives the liquid crystals according to a voltage charged therein for controlling the light transmissivity. The storage capacitor Cst sustains the voltage charged at the liquid crystal capacitor.

The backlight driver 30 drives the LED backlight unit 40 on the block-by-block basis according to the local dimming value of each block from the local dimming driver 10 for controlling the brightness of the LED backlight unit 40 on the block-by-block basis. If the LED backlight unit 40 is driven divided into a plurality of ports, a plurality of backlight drivers 30 for driving the plurality of ports, independently. The backlight driver 30 generates a pulse width modulation (PWM) signal having a duty ratio corresponding to the local dimming value of each block, and supplies an LED drive signal corresponding to the PWM signal of each block for driving the LED backlight unit 40 on the block-by-block. The backlight driver 30 drives the light emission blocks in succession by using the local dimming values received in an order of a block connection from the local dimming driver 10 for controlling the brightness of the backlight unit 40 on the block-by-block basis.

According to this, the liquid crystal display device of the present invention expresses a received picture data as multiplication of the brightness of the backlight controlled on the block-by-block basis to the light transmissivity controlled by the compensated data in the liquid crystal panel.

As has been described, the method for analyzing a light profile of a light source and device and method for driving local dimming of a liquid crystal display device by using the same of the present invention have the following advantages.

The method for analyzing a light profile of a light source of the present invention can reduce a capacity of a memory significantly by dividing a light analyzing region on one light source of a block into a plurality of symmetric regions taking symmetry of the light analyzing region into account and storing light quantity data of one of the symmetric regions.

The device and method for driving local dimming of a liquid crystal display device of the present invention can compensate data by utilizing the light quantity data on one symmetric region stored in the memory considering symmetry of the light quantity data enabling to use the light quantity analysis of each pixel identical to a case when all of the light quantity data of one light analyzing region on one block of light source is stored and utilized.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for driving local dimming of a liquid crystal display device comprising:
   dividing a light analyzing region of a light source of one of a plurality of blocks which divide a backlight unit into at least two symmetric regions considering a form and symmetry of a light emission region, measuring light quantities on sampling points only at one of the at least two symmetric regions, and storing light quantity data per sampling point of the one symmetric region to a memory;
   analyzing input image data on a block-by-block basis to determine a local dimming value per block;
   calculating a gain value by light quantity analysis using the light quantity data per sampling point stored in the memory and the local dimming value per block;

compensating the input image data using the gain value; and controlling brightness of the backlight unit on the block-by-block basis by using the local dimming value per block, wherein the calculating the gain value includes:

calculating a first total light quantity reaching to a corresponding pixel from light sources of blocks neighboring the corresponding pixel using the light quantity data per sampling point, when an entire backlight unit is at the maximum brightness, calculating a second total light quantity reaching to the corresponding pixel from the light sources of the blocks neighboring the corresponding pixel using the local dimming value per block and the light quantity data per sampling point, when the brightness of the backlight unit is controlled on the block-by-block basis according to the local dimming value per block, and calculating the gain value, which is used for compensating the input image data, as a ratio between the first total light quantity and the second total light quantity.

2. The method according to claim 1, wherein the light analyzing region is divided into four symmetric regions symmetric to each other in up, down, left, right directions if the backlight unit is a direct lighting type, and light quantity data on one of the four symmetric regions are stored to the memory.

3. The method according to claim 1, wherein the light analyzing region is divided into two symmetric regions symmetric to each other in up, down, or left, right directions if the backlight unit is an edge lighting type, and light quantity data on one of the two symmetric regions are stored in the memory.

4. The method according to claim 1, wherein the light quantity analysis uses the light quantity data on one of the symmetric regions as the light quantity data of the light analyzing region by accessing the one symmetric region of the light analyzing region repeatedly while changing a direction of access to the memory, considering symmetry of the symmetric region.

5. A method for driving a liquid crystal display device comprising:

dividing a light analyzing region of a light source of one of a plurality of blocks which are divisions of a backlight unit into at least two symmetric regions considering a form and symmetry of a light emission region, measuring light quantities on sampling points only at one of the at least two symmetric regions, and storing light quantity data per sampling point of the one symmetric region to a memory;

analyzing input image data on a block-by-block basis to determine a local dimming value per block;

calculating a gain value by light quantity analysis using the light quantity data sampling point stored in the memory and the local dimming value per block;

compensating the input image data using the gain value;

controlling brightness of the backlight unit on the block-by-block basis by using the local dimming value per block;

supplying a compensated image data to the liquid crystal display device; and displaying the input image data by a combination of the brightness of the backlight unit controlled on the block-by-block basis and light transmissivity controlled by the compensated image data in the liquid crystal panel, wherein the calculating the gain value includes;

calculating a first total light quantity reaching to a corresponding pixel from light sources of blocks neighboring the corresponding pixel using the light quantity data per sampling point, when an entire backlight unit is at the maximum brightness, calculating a second total light quantity reaching to the corresponding pixel from the light sources of the blocks neighboring the corresponding pixel using the local dimming value per block and the light quantity data per sampling point, when the brightness of the backlight unit is controlled on the block-by-block basis according to the local dimming value per block, and calculating the gain value, which is used for compensating the input image data, as a ratio between the first total light quantity and the second total light quantity.

6. The method according to claim 5, wherein the light analyzing region is divided into four symmetric regions symmetric to each other in up, down, left, right directions if the backlight unit is a direct lighting type, and light quantity data on one of the four symmetric regions are stored to the memory.

7. The method according to claim 5, wherein the light analyzing region is divided into two symmetric regions symmetric to each other in up, down, or left, right directions if the backlight unit is an edge lighting type, and light quantity data on one of the two symmetric regions are stored in the memory.

8. The method according to claim 5, wherein the light quantity analysis uses the light quantity data on one of the symmetric regions as the light quantity data of the light analyzing region by accessing the one symmetric region of the light analyzing region repeatedly while changing a direction of access to the memory, considering symmetry of the symmetric region.

9. A device for driving local dimming of a liquid crystal display device comprising:

an image analyzer analyzing input image data on a block-by-block basis corresponding to each of a plurality of blocks which divide a backlight unit;

a dimming value decider determining a local dimming value per block according to a result of analysis of the image analyzer;

a memory storing light quantity data per sampling point in one of at least two symmetric regions of a light analyzing region, wherein the light analyzing region is a light emitting region of a light source of one of the plurality of blocks and at least two symmetric regions divide the light analyzing region considering a form and symmetry of the light emission region;

a gain value calculator calculating a gain value by light quantity analysis using the light quantity data per sampling point stored in the memory and the local dimming value per block; and a data compensator compensating the input image data using the gain value from the gain value calculator, wherein the gain value calculator:

calculates a first total light quantity reaching to a corresponding pixel from light sources of blocks neighboring the corresponding pixel using the light quantity data per sampling point, when an entire backlight unit is at the maximum brightness, calculates a second total light quantity reaching to the corresponding pixel from the light sources of the blocks neighboring the corresponding pixel using the local dimming value per block and the light quantity data per sampling point, when the brightness of the backlight unit is controlled on the block-by-block basis according to the local dimming value per block, and calculates the gain value, which is used for compensating the input image data, as a ratio between the first total light quantity and the second total light quantity.

10. The device according to claim 9, wherein the light analyzing region is divided into four symmetric regions symmetric to each other in up, down, left, right directions if the backlight unit is a direct lighting type, and light quantity data on one of the four symmetric regions are stored to the memory.

11. The device according to claim 9, wherein the light analyzing region is divided into two symmetric regions symmetric to each other in up, down, or left, right directions if the backlight unit is an edge lighting type, and light quantity data on one of the two symmetric regions are stored in the memory.

12. The device according to claim 9, wherein the memory outputs the light quantity data on the light analyzing region by accessing one symmetric region of the light analyzing region repeatedly while changing a direction of access to the memory, considering symmetry of the symmetric region.

13. A liquid crystal display device comprising:
 a local dimming driver analyzing an input image data, generating a local dimming value per block and compensating the input image data according to the analyzing result;
 a panel driver for supplying the compensated image data from the local dimming driver to a liquid crystal panel;
 a timing controller for forwarding the compensated image data from the local dimming driver to the panel driver as well as controlling driving timing of the panel driver;
 a backlight unit including a plurality of blocks to irradiate light to the liquid crystal panel; and
 a backlight driver for driving the plurality of blocks by using the local dimming value per block from the local dimming driver,
 wherein the local dimming driver comprises:
 an image analyzer analyzing the input image data on a block-by-block basis corresponding to each of the plurality of blocks;
 a dimming value decider determining the local dimming value per block according to a result of analysis of the image analyzer;
 a memory storing light quantity data per sampling point in one of at least two symmetric regions of a light analyzing region, wherein the light analyzing region is a light emitting region of a light source of one of the plurality of blocks and at least two symmetric regions divide the light analyzing region considering a form and symmetry of the light emission region, and;
 a gain value calculator calculating a gain value by light quantity analysis using the light quantity data per sampling point stored in the memory and the local dimming value per block; and
 a data compensator compensating the input image data using the gain value from the gain value calculator,
 wherein the gain value calculator:
 calculates a first total light quantity reaching to a corresponding pixel from light sources of blocks neighboring the corresponding pixel using the light quantity data per sampling point, when an entire backlight unit is at the maximum brightness,
 calculates a second total light quantity reaching to the corresponding pixel from the light sources of the blocks neighboring the corresponding pixel using the local dimming value per block and the light quantity data per sampling point, when the brightness of the backlight unit is controlled on the block-by-block basis according to the local dimming value per block, and
 calculates the gain value, which is used for compensating the input image data, as a ratio between the first total light quantity and the second total light quantity.

14. The liquid crystal display device according to in claim 13, wherein the light analyzing region is divided into four symmetric regions symmetric to each other in up, down, left, right directions if the backlight unit is a direct lighting type, and light quantity data on one of the four symmetric regions are stored to the memory.

15. The liquid crystal display device as claimed in claim 13, wherein the light analyzing region is divided into two symmetric regions symmetric to each other in up, down, or left, right directions if the backlight unit is an edge lighting type, and light quantity data on one of the two symmetric regions are stored in the memory.

16. The liquid crystal display device according to in claim 13, wherein the memory outputs the light quantity data on the light analyzing region by accessing one symmetric region of the light analyzing region repeatedly while changing a direction of access to the memory, considering symmetry of the symmetric region.

17. The liquid crystal display device according to in claim 13, wherein the local dimming driver is built in the timing controller.

* * * * *